(12) United States Patent
McDermott et al.

(10) Patent No.: US 7,736,420 B2
(45) Date of Patent: Jun. 15, 2010

(54) CONTACT METHODS FOR FORMATION OF LEWIS GAS/LIQUID SYSTEMS AND RECOVERY OF LEWIS GAS THEREFROM

(75) Inventors: Wayne Thomas McDermott, Fogelsville, PA (US); Philip Bruce Henderson, Allentown, PA (US); Daniel Joseph Tempel, Macungie, PA (US); Ronald Martin Pearlstein, Macungie, PA (US); James Joseph Hart, Fogelsville, PA (US); Rosaleen Patricia Morris-Oskanian, Collegeville, PA (US); Diwakar Garg, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1062 days.

(21) Appl. No.: 11/437,326

(22) Filed: May 19, 2006

(65) Prior Publication Data
US 2007/0287812 A1 Dec. 13, 2007

(51) Int. Cl.
*B01D 53/14* (2006.01)
(52) U.S. Cl. .............. 95/149; 95/230; 95/232; 95/233; 95/234; 95/235
(58) Field of Classification Search .......... 526/88; 95/230–236, 46, 149; 423/210, 237, 240 R, 423/248
See application file for complete search history.

(56) References Cited

U.S. PATENT DOCUMENTS

| | | | | |
|---|---|---|---|---|
| 5,017,350 A | * | 5/1991 | Hakka et al. | 423/242.7 |
| 5,917,140 A | * | 6/1999 | Tom | 96/143 |
| 6,579,343 B2 | * | 6/2003 | Brennecke et al. | 95/51 |
| 6,660,063 B2 | * | 12/2003 | Tom et al. | 95/90 |
| 7,172,646 B2 | * | 2/2007 | Tempel et al. | 95/241 |
| 7,314,506 B2 | * | 1/2008 | Vininski et al. | 95/114 |
| 7,396,381 B2 | * | 7/2008 | Graham et al. | 95/46 |
| 7,410,586 B2 | * | 8/2008 | Beste et al. | 210/635 |
| 2004/0206241 A1 | | 10/2004 | Tempel et al. | |
| 2006/0105356 A1 | * | 5/2006 | Dutton et al. | 435/6 |
| 2006/0226074 A1 | * | 10/2006 | Wyse et al. | 210/634 |

FOREIGN PATENT DOCUMENTS

US  EP-1640654 A1 * 3/2006

OTHER PUBLICATIONS

"On Turning the copper(I) coordination number in halocuprate(I) anions: New insights into cation control" Catrin Hasselgren et al; Inorganic Chimica Acta, vol. 292, Issue 2, Sep. 15, 1999, p. 266-271 (accessible in public domain).*

* cited by examiner

*Primary Examiner*—Duane Smith
*Assistant Examiner*—Ives Wu
(74) *Attorney, Agent, or Firm*—Geoffrey L. Chase

(57) ABSTRACT

The invention relates to an improvement in apparatus and process for the formation of a complex of Lewis acidic or Lewis basic gases in a reactive liquid of opposite character and for the breaking (fragmentation) of said complex associated with the recovery of the Lewis gas therefrom. The improvement resides in forming finely divided droplets of reactive liquid and controlling the temperature, pressure and concentration of said Lewis gas of opposite character to provide for (a) the formation of said complex between said gas and reactive liquid or (b) the breaking of said complex and the recovery of the atomized droplets of reactive liquid.

12 Claims, 5 Drawing Sheets

CONTACT METHODS FOR FORMATION OF LEWIS GAS/LIQUID SYSTEMS AND RECOVERY OF LEWIS GAS THEREFROM

BACKGROUND OF THE INVENTION

Many processes in the semiconductor industry require a reliable source of process gases for a wide variety of applications. Often these gases are stored in cylinders or vessels and then delivered to the process under controlled conditions from the cylinder. The semiconductor manufacturing industry, for example, uses a number of hazardous specialty gases such as phosphine ($PH_3$), arsine ($AsH_3$), and boron trifluoride ($BF_3$) for doping, etching, and thin-film deposition. These gases pose significant safety and environmental challenges due to their high toxicity and pyrophoricity (spontaneous flammability in air). In addition to the toxicity factor, many of these gases are compressed and liquefied for storage in cylinders under high pressure. Storage of toxic gases under high pressure in metal cylinders is often unacceptable because of the possibility of developing a leak or catastrophic rupture of the cylinder.

One recent approach to storage and delivery of Lewis acid and Lewis base gases (e.g., $PH_3$, $AsH_3$, and $BF_3$) resides in the complexing of the Lewis base or Lewis acid in a reactive liquid of opposite Lewis character, e.g., an ionic liquid (e.g., a salt of alkylphosphonium or alkylammonium) of opposite Lewis character. Such liquid adduct complexes provide a safe, low pressure method of storage, transporting and handling highly toxic and volatile compounds.

The following reference illustrates a delivery system for Lewis basic and acidic gases from reactive liquids and proposed mechanisms for the formation of Lewis complexes of Lewis gases with reactive liquids and for recovering the gases from the reactive liquids and delivering the respective gases to the onsite facility:

US 2004/0206241 (the subject matter of which is incorporated by reference) discloses a system for storing Lewis base and Lewis acidic gases in a nonvolatile, reactive liquid having opposing Lewis acidity and Lewis basicity. Preferred systems employ the storage and delivery of arsine, phosphine and $BF_3$ in an ionic liquid.

SUMMARY OF THE INVENTION

The invention relates to an improvement in apparatus and process for (a) the formation of a complex of Lewis acidic or Lewis basic gases in a reactive liquid of opposite Lewis character and (b) the breaking (fragmentation) of said complex of said Lewis acidic or Lewis basic gases in a reactive liquid of opposite character associated with the recovery of the Lewis gas therefrom. The improvement resides in the steps comprising:

atomizing the reactive liquid under conditions for forming droplets of said reactive liquid; and, controlling the temperature, pressure and concentration of said Lewis gas to provide for (a) the formation of said complex between said gas and reactive liquid and (b) the breaking of said complex and the recovery of the atomized droplets of reactive liquid.

Several advantages can be achieved through the process described here and some of these include:

an ability to facilitate faster complexing of the gas with the reactive liquid; and, an ability to effect faster and more efficient withdrawal and recovery of gas from the reactive liquid.

DETAILED DESCRIPTION OF THE INVENTION

Figures 1, 1A:
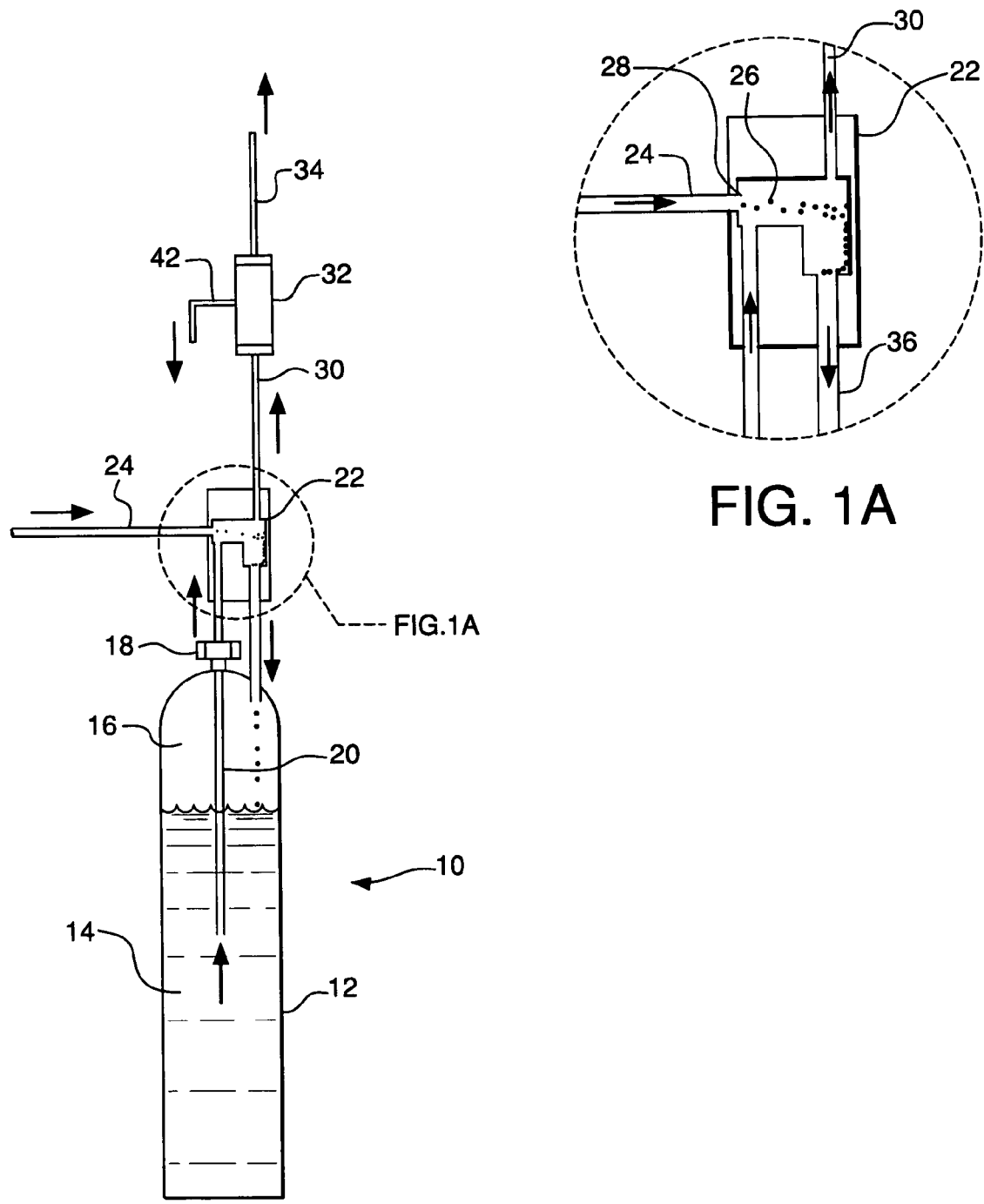
FIGS. 1 and 1A are views of an apparatus for effecting for formation of complexes of Lewis gases with reactive liquids of opposite Lewis character using a carrier gas and for the recovery of gas from the complex.

In one type of low-pressure storage and delivery system gases having Lewis basicity or acidity, particularly hazardous specialty gases such as phosphine, arsine and boron trifluoride which are utilized in the electronics industry, are stored as a complex in a continuous liquid medium. A reversible reaction is effected between the gas having Lewis basicity with a reactive liquid having Lewis acidity and, alternatively, a gas having Lewis acidity with a reactive liquid having Lewis basicity resulting in the formation of a complex (sometimes herein referred to as having opposing Lewis character).

In these storage and delivery systems a suitable reactive liquid having low volatility and preferably having a vapor pressure below about $10^{-2}$ Torr at 25° C. and, more preferably, below $10^{-4}$ Torr at 25° C. is used. Ionic liquids are representative and preferred as they can act either as a Lewis acid or Lewis base, for effecting reversible reaction with the gas to be stored. The acidity or basicity of the reactive ionic liquids is governed by the strength of the cation, the anion, or by the combination of the cation and anion employed in the ionic liquid. The most common ionic liquids comprise salts of alkylphosphonium, alkylammonium, N-alkylpyridinium or N,N'-dialkylimidazolium cations. Common cations contain $C_{1-18}$ alkyl groups, and include the ethyl, butyl and hexyl derivatives of N-alkyl-N'-methylimidazolium and N-alkylpyridinium. Other cations include pyridazinium, pyrimidinium, pyrazinium, pyrazolium, triazolium, thiazolium, and oxazolium.

When the system is used for storing phosphine or arsine, a preferred reactive liquid is an ionic liquid and the anion component of the reactive liquid is a cuprate or aluminate and the cation component is derived from a dialkylimidazolium salt.

Gases having Lewis basicity to be stored and delivered from Lewis acidic reactive liquids, e.g., ionic liquids, may comprise one or more of phosphine, arsine, stibene, ammonia, hydrogen sulfide, hydrogen selenide, hydrogen telluride, isotopically-enriched analogs, basic organic or organometallic compounds, etc.

With reference to Lewis basic ionic liquids, which are useful for chemically complexing Lewis acidic gases, the anion or the cation component or both of such ionic liquids can be Lewis basic. In some cases, both the anion and cation are Lewis basic. Examples of Lewis basic anions include carboxylates, fluorinated carboxylates, sulfonates, fluorinated sulfonates, imides, borates, chloride, etc. Common anion forms include $BF_4^-$, $PF_6^-$, $AsF_6^-$, $SbF_6^-$, $CH_3COO^-$, $CF_3COO^-$, $CF_3SO_3^-$, p —$CH_3$—$C_6H_4SO_3^-$, $(CF_3SO_2)_2N^-$, $(NC)_2N^-$, $(CF_3SO_2)_3C^-$, chloride, and $F(HF)_n^-$. Other anions include organometallic compounds such as alkylaluminates, alkyl- or arylborates, as well as transition metal species. Preferred anions include $BF_4^-$, p-$CH_3$—$C_6H_4SO_3^-$, $CF_3SO_3^-$, $(CF_3SO_2)_2N^-$, $(NC)_2N^-$ $(CF_3SO_2)_3C^-$, $CH_3COO^-$ and $CF_3COO^-$.

Ionic liquids comprising cations that contain Lewis basic groups may also be used in reference to complexing gases having Lewis acidity. Examples of Lewis basic cations include N,N'-dialkylmidazolium and other rings with multiple heteroatoms. A Lewis basic group may also be part of a substituent on either the anion or cation. Potentially useful Lewis basic substituent groups include amine, phosphine, ether, carbonyl, nitrile, thioether, alcohol, thiol, etc.

Gases having Lewis acidity to be stored in and delivered from Lewis basic reactive liquids, e.g., ionic liquids, may comprise one or more of diborane, boron trifluoride, boron trichloride, $SiF_4$, germane, hydrogen cyamide, HF, HCl, HI, HBr, $GeF_4$, isotopically-enriched analogs, acidic organic or organometallic compounds, etc.

Examples of liquids bearing Lewis acid functional groups include substituted boranes, borates, aluminums, or alumoxanes; protic acids such as carboxylic and sulfonic acids, and complexes of metals such as titanium, nickel, copper, etc.

Examples of liquids bearing Lewis basic functional groups include ethers, amines, phosphines, ketones, aldehydes, nitriles, thioethers, alcohols, thiols, amides, esters, ureas, carbamates, etc. Specific examples of reactive covalent liquids include tributylborane, tributyl borate, triethylaluminum, methanesulfonic acid, trifluoromethanesulfonic acid, titanium tetrachloride, tetraethyleneglycol dimethylether, trialkylphosphine, trialkylphosphine oxide, polytetramethyleneglycol, polyester, polycaprolactone, poly(olefin-alt-carbon monoxide), oligomers, polymers or copolymers of acrylates, methacrylates, or acrylonitrile, etc. Often, though, these liquids suffer from excessive volatility at elevated temperatures and are not suited for thermal-mediated evolution. However, they may be suited for pressure-mediated evolution.

To effect the formation of the gas/liquid complex there is the step of contacting the reactive liquid with the respective Lewis gas under conditions for forming the complex, and to effect evolution of the gas from the reactive liquid for on site delivery it is necessary to break the complex (fragmentation). Each step in the process, either for formation of the complex or breaking of the complex requires mass transfer of the gas through the free surface of the bulk liquid. Mass transfer often is limited because some of the reactive liquids are viscous inhibiting mixing of Lewis gas with reactive liquid. The economy of the process is dependant on the ability to effect exchange of gas in and out of the reactive liquid of opposite Lewis character.

The present invention allows for fast complexing of the gas and an ionic liquid and a fast breaking of the complex and withdrawal and recovery of the Lewis gas from the reactive liquid/gas complex. In achieving formation of the complex of Lewis gas and reactive liquid or achieving recovery of the Lewis gas therefrom, the reactive liquid is atomized into fine droplets. It has been found that with the increased surface area of the atomized droplets, energy and mass can be more readily transported for facilitating the formation and breaking of the complex between the gas and the ionic liquid.

A wide variety of atomization methods can be used to generate finely divided droplets, and these include: a vibrating orifice, compressed gas atomizer, nebulizer, jet disintegrator, spinning disk generator, ultrasonic nebulizer and secondary droplet break-up in a high velocity gas, film-wise atomization, flashing, electrical atomization, and the like. A preferred atomizer is an ultrasonic nebulizer. Such nebulizers utilize high frequency, high amplitude piezoelectric ceramic transducers or magnetostrictive devices to produce intense agitation and the formation of larger numbers of small droplets. Typical operating frequencies are 20,000-40,000 cycles/second. Spinning disks typically produce liquid droplets in the 10-100 micrometer size range, depending on the surface tension and viscosity of the liquid. Disks typically operate at 3,000-100,000 rpm.

To facilitate an understanding of the formation and complexing process, in terms of the general description above, reference is made to the figures. FIG. 1 shows a storage and dispensing system 10 and FIG. 1A provides further detail as to a chamber designed for achieving the complexing or the breaking of the complex of Lewis gas and reactive liquid.

The system is comprised of a storage and dispensing vessel 12 such as a conventional gas cylinder container of elongate character. The interior is designed for retaining a liquid 14 of a suitable reactivity with the gas to be stored and a head space 16 for non complexed gas. Vessel 12 is provided at its upper end with a conventional cylinder gas valve 18 for regulating flow of liquid into and out of cylinder 12. Disposed within vessel 12 is tube 20 for delivery of reactive liquid to and from vessel 12.

To enhance the rate of complex formation or the rate of fragmentation of the complex, as the case may be, the reactive liquid is withdrawn from container 12 via tube 20 and introduced into chamber 22. A carrier gas, which may be an inert gas (e.g., helium, argon or other noble gas) or Lewis gas of opposite Lewis character, as the case may be, is introduced into chamber 22 via line 24. The reactive liquid is atomized in chamber 22 into finely divided droplets 26 (FIG. 1A) by passage of the gas through an atomizing orifice 28 and contacting the reactive liquid with the high velocity gas. Typical droplet sizes are on the 1-100 micrometer range (micron), depending upon gas and liquid properties. The increase in liquid surface to volume ratio through formation of finely divided droplets 26 or micro-droplets of ionic liquid droplets provides for a substantially improved ratio of interfacial surface area to liquid volume. This increase in surface area to liquid volume greatly improves the rate of mass and heat transfer into the liquid. For example, a 1-liter spherical volume of liquid aerosolized into 1 micron droplets, can provide a total of $1.9 \times 10^{15}$ droplets. In the process, the surface area of the liquid is increased by a factor of $2.4 \times 10^{20}$. And the surface area per unit volume of liquid is increased from 0.48 $cm^2/cm^3$ to $6 \times 10^4$ $cm^2/cm^3$.

The liquid droplets 26 in chamber 22 are separated from the gas phase through any one of various means well known in the art of aerosol handling, such as for example gravitational settling or impaction onto internal surfaces of chamber 22. The separated liquid then returns through a liquid pump (not shown) or through gravity-induced flow to container 12 through line 36. In an alternate embodiment of the invention, the separated liquid phase flows via line 36 to a separate liquid container (not shown).

Lewis gas and carrier gas are passed through line 30 to mist eliminator 32 and the gas is recovered via line 34. Spent liquid is withdrawn via line 42 to a separate liquid vessel (not shown), or returned to container 12 using a liquid pump (not shown) or through gravity-induced flow which is shown.

The temperature and pressure in chamber 22 are controlled to preselect conditions to favor either complexing or fragmentation of the Lewis acidic or basic gas with the reactive liquid of opposite character, or fragmentation thereof. These conditions are based upon, inter alia, the affinity of the Lewis gas for the Lewis liquid, and so forth.

Mist eliminator 32 may use any means for effecting gas/liquid phase separation, including inertial impaction, gravitational settling, electrostatic deposition, thermophoretic deposition, vortex tube or cyclone, gas phase centrifuge, capture in demister media, acoustic precipitation, magnetic separators, etc. Gas is removed for delivery in the case of fragmentation, and reclaim in the case of formation. Complexed reactive liquid may be introduced to containers for on site delivery.

Figure 2A:
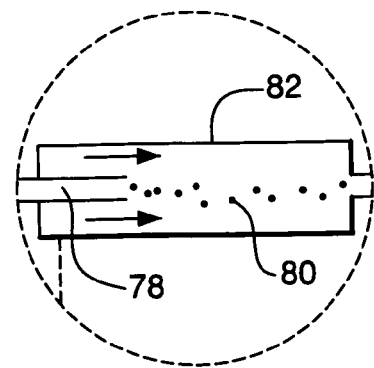
FIGS. 2 and 2A are views of an apparatus for effecting for formation of complexes and for the recovery of Lewis gases with reactive liquids of opposite character using a pump.
Figure 2:
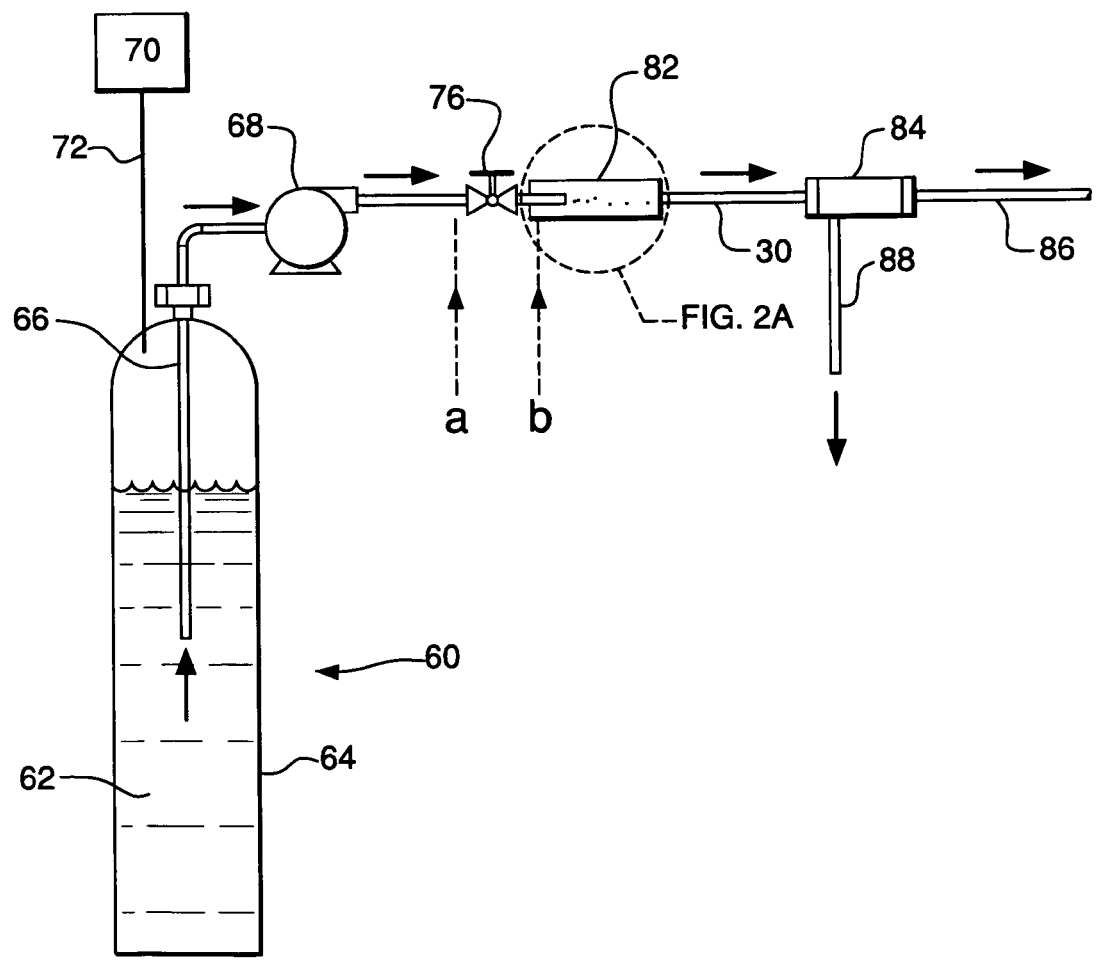

FIG. 2 provides an illustration of a second embodiment 60 of the invention. In one method of practicing this embodiment, illustrating recovery of Lewis gas from a complexed ionic liquid, the complexed liquid 62 is withdrawn from container 64 via tube 66 by means of pump 68. As liquid is removed from container 64 a steady pressure is maintained in the container using a gas supplied from pressure regulated gas source 70 via gas line 72. The gas supplied via line 72 may be an inert gas (e.g., helium, argon or other noble gas) or Lewis gas of opposite Lewis character, as the case may be.

In another method of practicing this embodiment, and illustrating recovery of Lewis gas from a complexed ionic liquid, the complexed liquid 62 is withdrawn from container 64 via tube 66 by means of static head pressure, or "pressure push" provided by pressure regulated gas source 70 via gas line 72. In this method of withdrawing liquid from container 64, pump 68 is not required.

The pressurized complexed liquid is atomized via passage through pressure reducing device 76 and/or nozzle 78 and the droplets 80 are introduced to chamber 82, which is maintained under partial vacuum. Pressure reducing device 76 may comprise any flow restricting orifice or adjustable valve or automatic pressure regulating device well known in the art of liquid pressure reduction. Nozzle 78 may comprise any of the devices well known in the art of liquid atomization, including but not limited to swirl spray nozzles, fan spray nozzles, impact nozzles, rotary atomizers and twin fluid atomizers The finely divided droplets 80 under partial vacuum evolve the Lewis gas.

Lewis gas and carrier gas are passed through line 30 to mist eliminator 84 and the gas is recovered via line 86. Spent liquid is withdrawn via line 88 to a separate liquid container (not shown) through a pump (not shown) or through gravity-induced flow, or returned to container 64 through a pump (not shown).

The apparatus of FIGS. 2 and 2A also can be used to form the complex. In this embodiment, a cooled Lewis gas is introduced at point (a) and/or (b) to contact cooled noncomplexed Lewis liquid dispersed as finely divided droplets 80 in chamber 82. The droplets 80 may be formed by passing the reactive liquid through a nozzle 78 of the type shown in FIG. 2. An enhanced rate of mass transfer occurs in expansion chamber 82, thereby forming the required complex. Complexed liquid is collected from mist eliminator 84 via line 88 or in a downstream phase separator device (not shown). Recovery of complexed liquid may be achieved via methods listed above.

Figure 3:
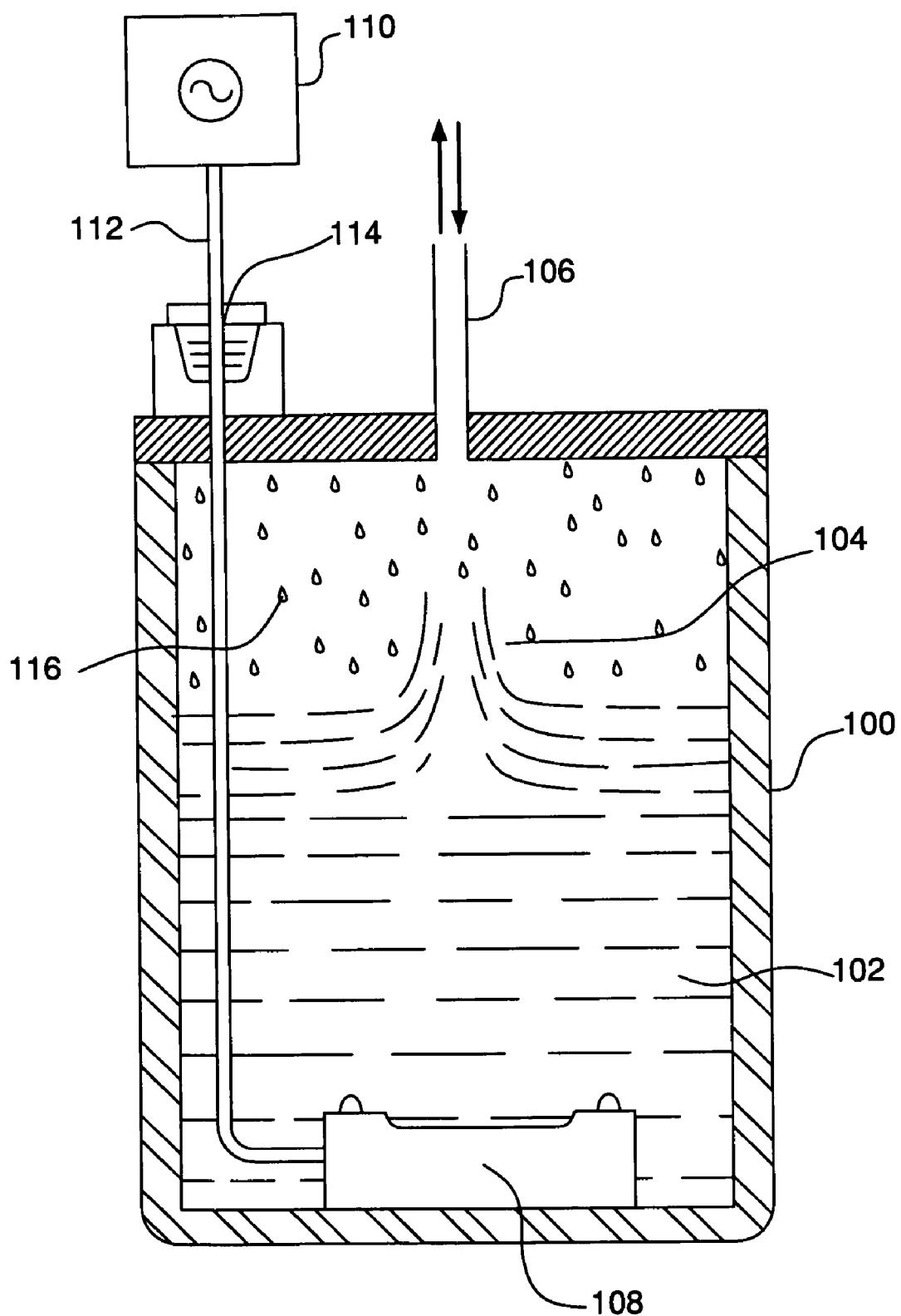
FIG. 3 is a view of an apparatus using for formation of complexes and for the recovery of Lewis gases from reactive liquids of opposite character using an ultrasonic nebulizer as a mechanism for forming finely, divided droplets.
Figure 4:
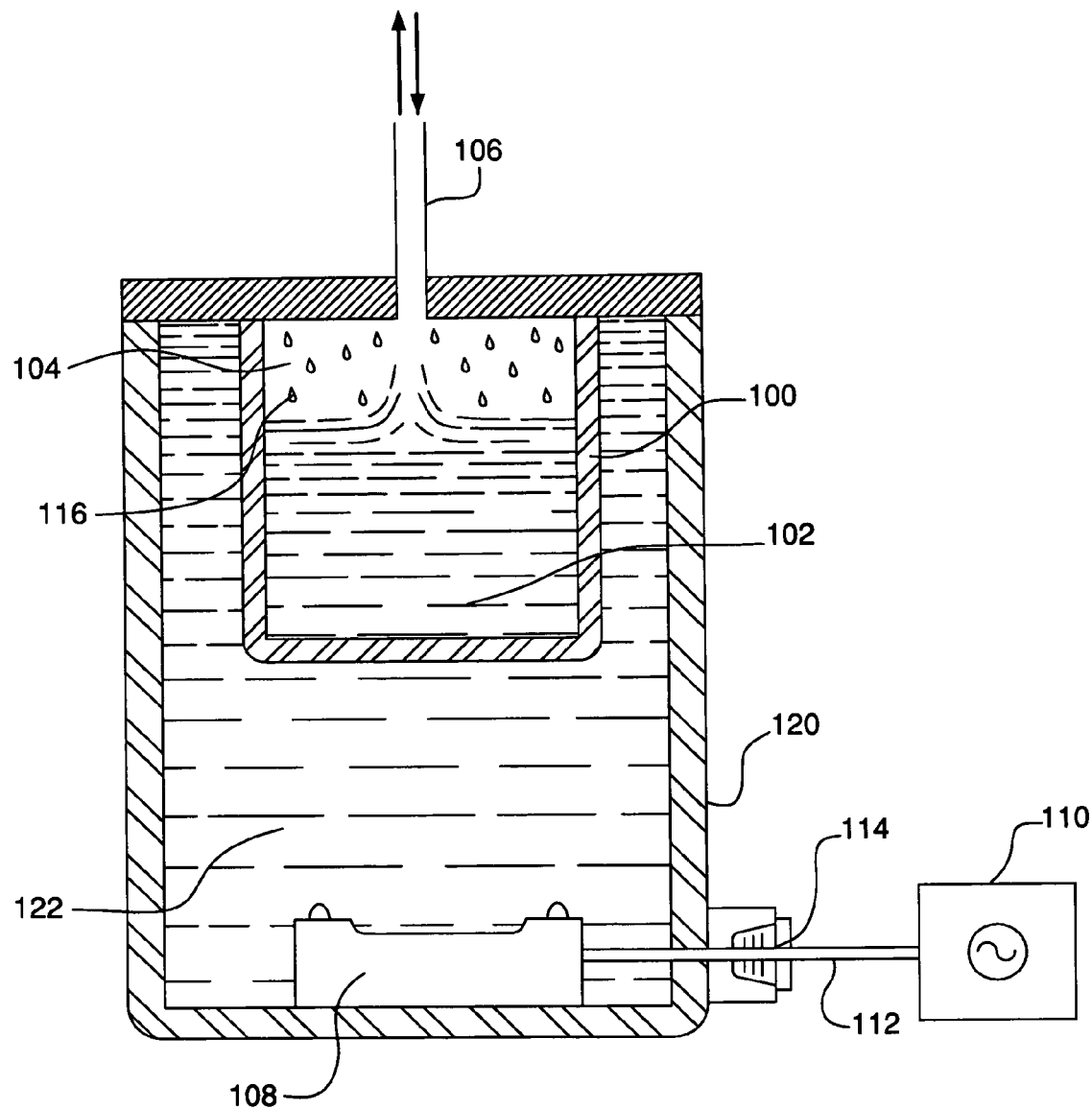
FIG. 4 is a view of an apparatus for formation of complexes and for the recovery of Lewis gases with reactive liquids of opposite character where the reactive liquid is stored within a container which is separated from an ultrasonic nebulizer by a coupling fluid.
Figure 5:
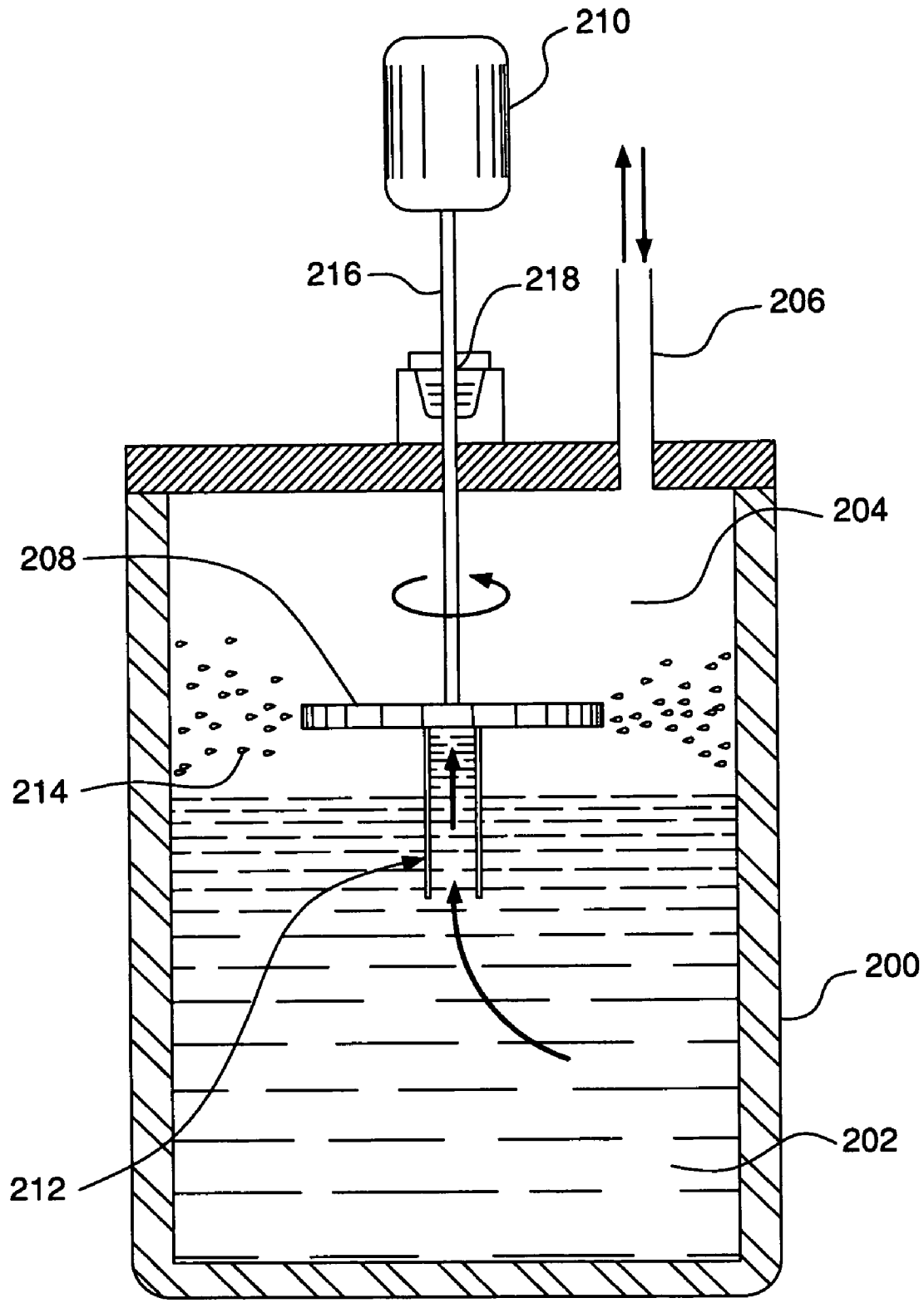
FIG. 5 is a view of an apparatus using a spinning disk to achieve the formation of finely divided droplets.

FIGS. 3, 4, and 5 illustrate methods for forming a complex of Lewis gas in a reactive liquid as well as the fragmenting thereof while in the container, where similar parts bear the same part numbers. In the embodiment shown in FIG. 3, container 100 contains liquid 102 and a head space 104. Gas may be introduced or removed from container 100 via line 106. A piezoelectric transducer or magnetostrictive device 108 is submerged in Lewis liquid 102. Power from a signal generator 110 is sent to the transducer through a shielded cable 112 which is fed through a seal 114 in the container. Finely divided droplets 116 are formed when the piezoelectric transducer is activated. The finely divided droplets of reactive liquid are contacted with a Lewis gas of opposite character and introduced via line 106 under conditions of complex formation. If delivery of Lewis gas from reactive liquid 102 is desired, the piezoelectric transducer or magnetostrictive device is designed to generate finely divided droplets of complexed liquid under conditions which are favorable for fragmentation. For example, complexed liquid 102 may be heated and/or the pressure reduced in container 100. Gas evolves from the reactive liquid having opposing Lewis character.

FIG. 4 illustrates a variation of the embodiment in FIG. 3 in which the piezoelectric transducer is submerged in a less chemically aggressive coupling fluid than the reactive liquid. In this embodiment the container 100 is sealed within outer container 120. Piezoelectric transducer 108 provides ultrasonic energy which moves through coupling fluid 122 and through the walls of container 100 and then into the reactive liquid 102. The process then is similar to that described in FIG. 3 wherein complex formation and fragmentation are achieved in similar manner. An advantage of this embodiment is that it does not expose the piezoelectric transducer or magnetostrictive device 108 to a chemically aggressive environment. The disadvantage of this method is that ultrasonic energy losses are incurred during transmission through the coupling medium and walls of container 100.

FIG. 5 shows an embodiment that utilizes centrifugal forces provided by a spinning disk or spinning drum to generate finely divided liquid droplets. Container 200 holds reactive liquid 202 and provides head space 204. Lewis gas may be introduced or removed from container 200 via line 206. In contrast to the piezoelectric transducer of FIG. 3, this embodiment uses spinning disk 208 to generate finely divided droplets of reactive liquid. Spinning disk 208 is powered by motor 210 which is coupled to spinning disk 208 via drive shaft 216 passing through rotational sealing device 218. Liquid 202 is drawn into spinning disk 208 via partially submerged liquid delivery line 212 and converted to finely divided droplets 214. Conditions are controlled to effect formation of the complex of Lewis gas with reactive liquid 202 by introducing Lewis gas through line 206 or cause fragmentation of the complex and evolve gas from container 200 via line 206.

The invention claimed is:

1. A process for recovering a Lewis gas complexed in a reactive liquid whereby the gas is held in a reversibly reacted state within said reactive liquid, the improvement which comprises the steps:

forming finely divided droplets of said reactive liquid complexed with said Lewis gas;

maintaining conditions or pressure and temperature allowing for fragmentation of said complex and the release of said Lewis gas from said complex;

recovering the Lewis gas after the fragmentation of said complex.

2. The process of claim 1 wherein the finely divided liquid droplets are formed by atomization.

3. The process of claim 2 wherein the finely divided liquid droplets are formed an atomizer selected from the group consisting of vibrating orifice, compressed gas, jet disintegrator, ultrasonic nebulizer, and spinning disk.

4. The process of claim 2 wherein the size of the finely divided liquid droplets is from 1 to 100 micrometers.

5. The process of claim 4 wherein the Lewis basic gas is selected from the group consisting of phosphine, arsine, stibene, ammonia, hydrogen sulfide, hydrogen selenide, hydrogen telluride, and isotopically-enriched analogs and the Lewis acidic gas is selected from the group consisting of diborane, boron trifluoride, boron trichloride, $SiF_4$, germane, hydrogen cyanide, HF, HCl, HI, HBr, $GeF_4$, and isotopically-enriched analogs.

6. The process of claim 5 wherein the ionic liquid is comprised of a salt of alkylphosphonium, alkylammonium, N-alkylpyridinium, N,N-dialkylpyrrolidinium or N,N'-dialkylimidazolium.

7. The process of claim 6 wherein the anion component of said ionic liquid having Lewis acidity is derived from a chlorometallate selected from the group consisting of $CuCl_2^-$, $Cu_2Cl_3^-$, $AlCl_4^-$, $Al_2Cl_7^-$, $ZnCl_3^-$, $ZnCl_4^{2-}$, $Zn_2Cl_5^-$, $FeCl_3^-$, $FeCl_4^-$, $Fe_2Cl_7^-$, $TiCl_5^-$, $TiCl_6^{2-}$, $SnCl_5^-$, and $SnCl_6^{2-}$.

8. The process of claim 7 wherein the Lewis basic gas is phosphine and the ionic liquid is comprised of a salt of alkylphosphonium, alkylammonium, N-alkylpyridinium or N,N'-dialkylimidazolium cation and $Cu_2Cl_3^-$ anion.

9. The process of claim 6 wherein the anion component of said ionic liquid having Lewis basicity is selected from the group consisting of carboxylates, fluorinated carboxylates, sulfonates, fluorinated sulfonates, imides, borates, and halides.

10. The process of claim 9 wherein the anion component of said ionic liquid having Lewis basicity is selected from the group consisting of $BF_4^-$, $PF_6^-$, $AsF_6^-$, $SbF_6^-$, $CH_3COO^-$, $CF_3COO^-$, $CF_3SO_3^-$, $p-CH_3-C_6H_4SO_3^-$, $(CF_3SO_2)_2N^-$, $(NC)_2N^-$, $(CF_3SO_2)_3C^-$, chloride, and $F(HF)_n^-$.

11. The process of claim 10 wherein the Lewis acidic gas is boron trifluoride and the ionic liquid is comprised of a salt of alkylphosphonium, alkylammonium, N-alkylpyridinium or N,N'-dialkylimidazolium cation and $BF_4^-$ anion.

12. The process of claim 1 wherein the finely divided droplets are carried in an inert carrier gas.

\* \* \* \* \*